Patented Sept. 26, 1922.

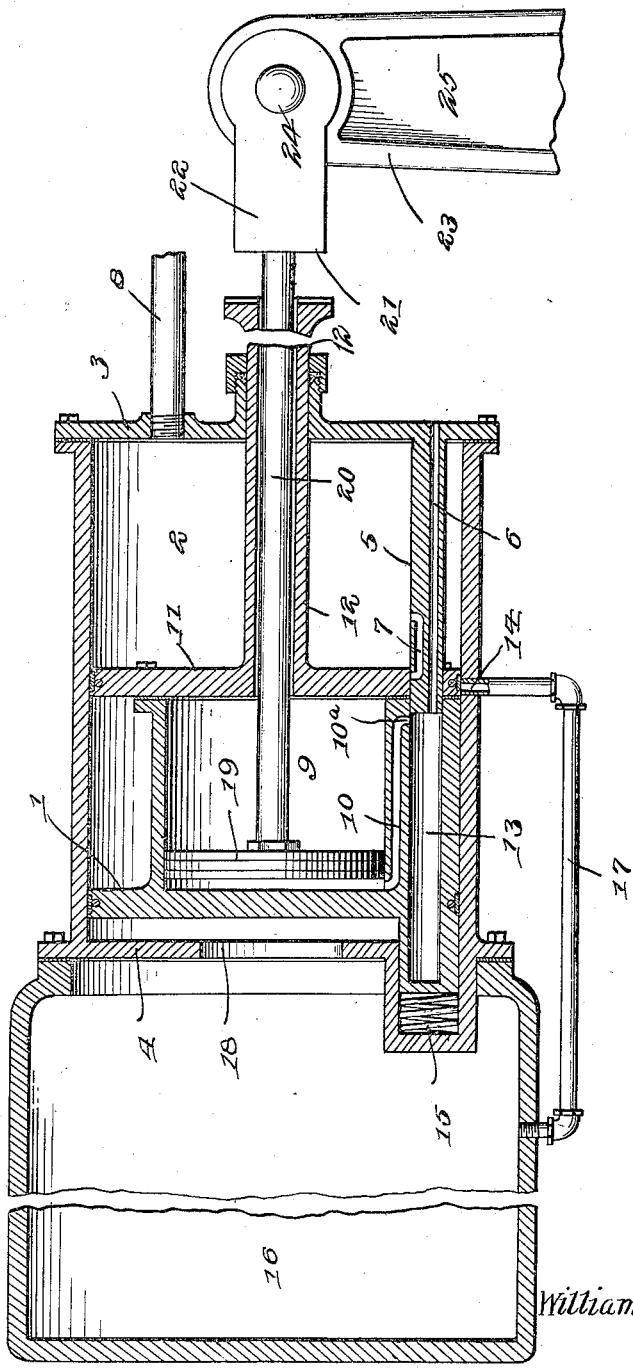

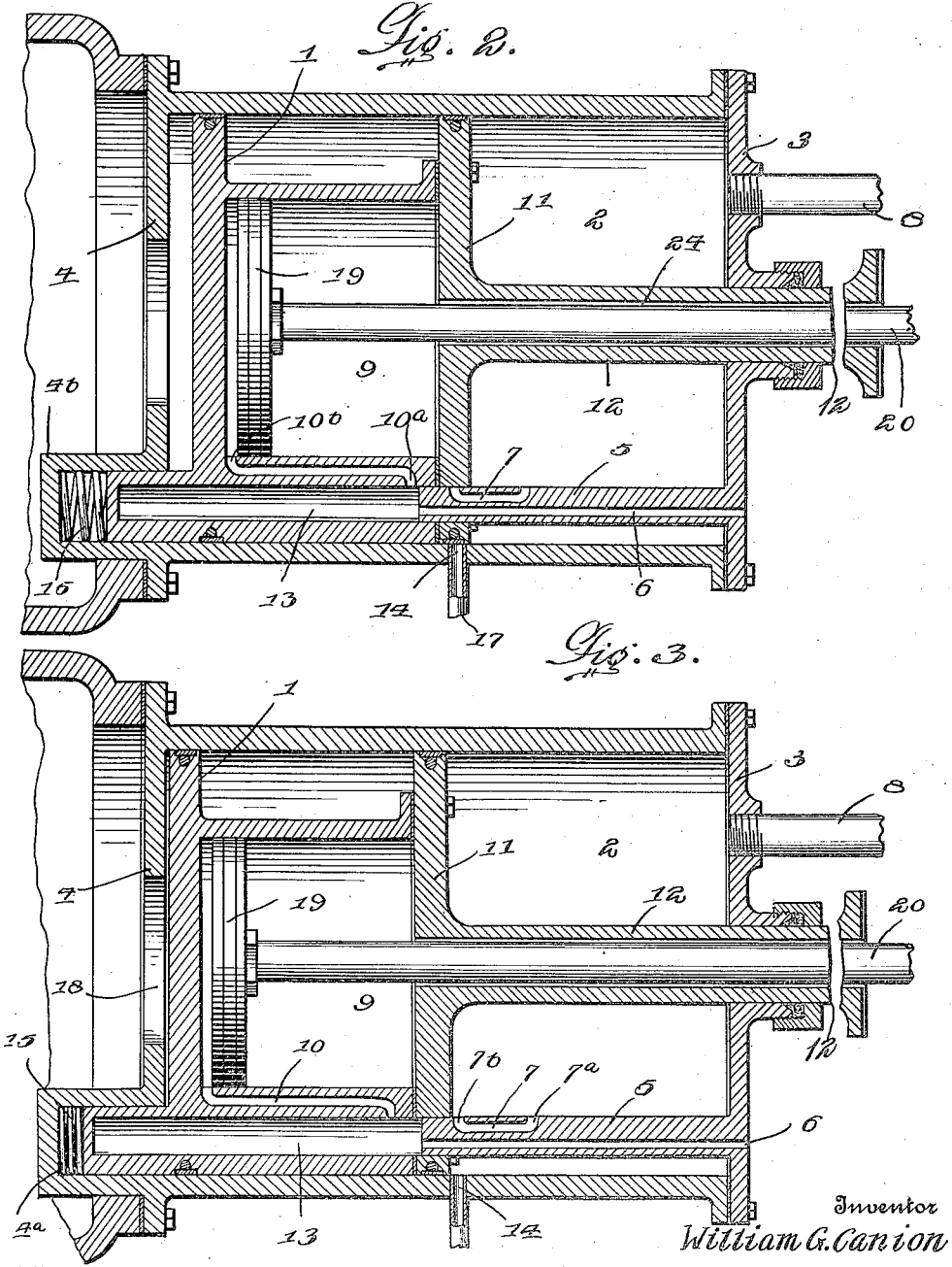

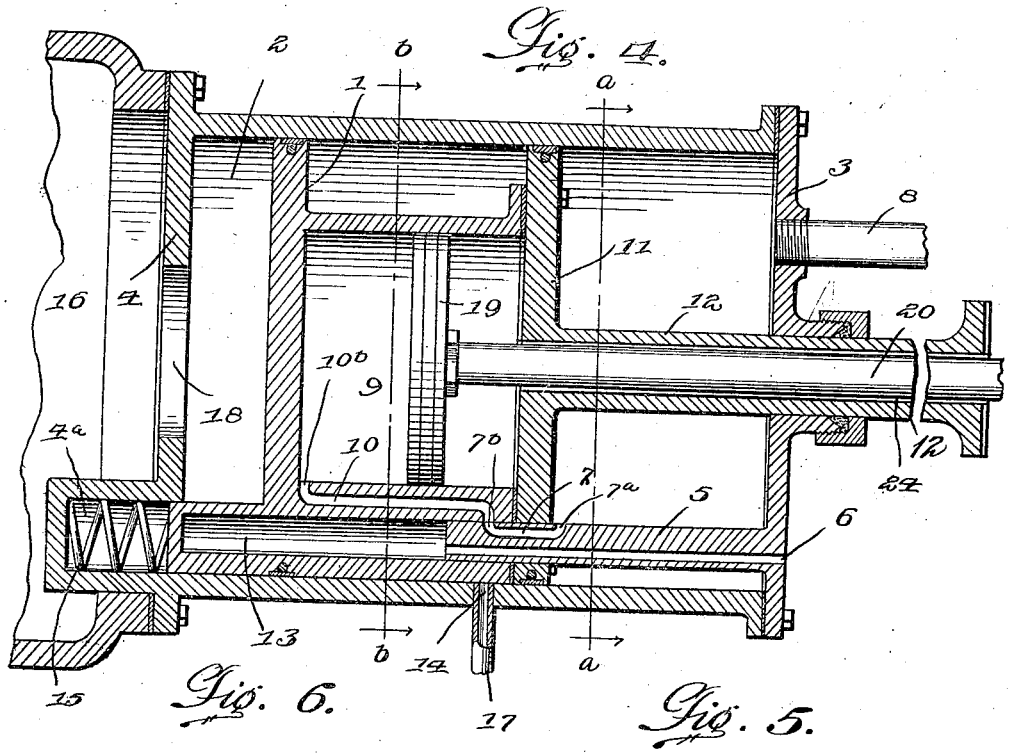

1,430,358

UNITED STATES PATENT OFFICE.

WILLIAM G. CANION, OF BALTIMORE, MARYLAND, ASSIGNOR TO CANION AIR BRAKE COMPANY, OF BISBEE, ARIZONA, A CORPORATION OF ARIZONA.

COMPOUND AIR BRAKE.

Refiled for abandoned application Serial No. 819,265, filed February 17, 1914. This application filed June 28, 1921. Serial No. 481,164.

*To all whom it may concern:*

Be it known that I, WILLIAM G. CANION, a citizen of the United States, residing at Baltimore, in the State of Maryland, have invented certain new and useful Improvements in Compound Air Brakes; and I do hereby declare the following to be a full, clear, and exact description of the invention, such as will enable others skilled in the art to which it appertains to make and use the same.

This invention is an improved air brake apparatus adapted to automatically take up the slack in the brake chain and embodying a prime moving slack adjusting piston arranged in and movable independently of the main brake applying piston which operates in the brake cylinder, and means for automatically controlling the operation of the said pistons as hereinafter described and claimed.

This invention is an improvement on the compound air brake described and claimed in my copending application for Letters Patent of the United States, Serial No. 481,163, filed June 28, 1921.

One object of my invention is to provide improved fluid pressure brake apparatus of this character including a plurality of brake operating pistons and means to utilize a charge to independently move the pistons to brake applying position and one in advance of the other.

Another object of my invention is to provide fluid pressure brake apparatus of this character embodying a plurality of brake operating pistons and automatically acting means to utilize a charge to independently move the pistons to brake applying position one in advance of the other.

Another object of my invention is to provide improved fluid pressure brake apparatus of this character embodying a plurality of brake operating pistons and means to simultaneously move the pistons to brake applying position at different rates of speed.

Another object of my invention is to provide improved compound air brake apparatus which may be used in the same train in connection with ordinary air brake apparatus.

Another object is to provide an improved compound air brake apparatus for operating automatically when pressure is reduced through the train pipe and which is at all times under direct control.

Another object of my invention is to provide improved compound fluid pressure brake apparatus which is cushioned when in ordinary brake applying position and prevents the train wheels from becoming locked and flattened.

Another object is to provide improved fluid pressure brake apparatus of this character which effects a considerable economy of fluid under pressure and used in its operation.

Another object is to provide improved fluid pressure brake apparatus of this character which is cheap and simple, is readily operated, may be readily installed and is not likely to get out of order.

Another object of my invention is to simplify the construction of the valves and cause them to be operated by the pistons so that "sticking" of the valves is entirely prevented.

In the accompanying drawings:—

Figure 1 is a vertical longitudinal sectional view of compound air brake apparatus constructed in accordance with my invention and in release position.

Figure 2 is a similar view, on a larger scale, of the brake cylinder and pistons and showing the pistons in release position.

Figure 3 is a similar view of the same and with the pistons in a position they assume for an instant, just prior to assuming release position.

Figure 4 is a similar view of the same, with the pistons in brake applying position.

Figure 5 is a detail vertical transverse sectional view of the same on the plane indicated by the line *a—a* of Figure 4.

Figure 6 is a similar view of the same on the plane indicated by the line *b—b* of Figure 4.

In accordance with my invention the main brake piston 1 is arranged for operating in the brake cylinder 2. The latter has a front head 3 and a rear head 4 and in one side of the cylinder is a fixed cylindrical piston valve 5 which is secured to and extends rearwardly from the front head 3. This fixed piston valve is provided with a bore 6 that extends therethrough from end to end and is also provided, in one side, and at a suitable distance from its inner end with a bypass 7 which has ports 7$^a$—7$^b$ at opposite ends. The usual train pipe 8 is here shown attached to the cylinder head 3.

The main brake piston 1 is provided with a cylindrical chamber 9 and with a front member 11 which closes the front end of said chamber. A tubular rod 12 extends from the front side of the piston 1 and operates in a packing box with which the cylinder head 3 is provided.

A movable valve member 13 is carried by the main piston and is here shown as a tube or barrel having a longitudinal bore to receive the fixed piston valve 5. This movable valve member 13 is open at the front end, excepting for the said fixed piston valve 5 and is closed at its rear end. Its rear end also projects rearwardly from the piston 1 and is arranged to operate in a cylindrical pocket 4$^a$ with which the rear cylinder head 4 is provided, said cylinder head being provided with an enlargement 4$^b$ in which the said pocket is formed. A spring 15, which is here shown as a strong compound spring, is arranged in the said pocket 4$^a$.

In one side of the cylinder is a port 14 which is at or near its center and the said port is closed by the piston 1 when the latter is in release position. The brake cylinder is connected to an auxiliary reservoir 16, the latter being here shown attached directly to the rear head of the cylinder and the rear cylinder head being provided with an opening 18 which establishes communication between the auxiliary reservoir and the rear end of the brake cylinder. A pipe 17 connects the auxiliary reservoir with the port 14 and in a sense the said pipe, port, auxiliary reservoir and opening 18 form a bypass between the ends of the cylinder and around the main brake piston when the latter is at the extreme rear or inward limit of its movement, or in initial release position.

The piston 1 is formed with a bypass 10 at one side of its cylindrical chamber 8, said bypass having a port 10$^a$ opening into the movable tubular piston valve member 13 and also having a port 10$^b$ opening into the rear end of said chamber 9.

A prime acting piston 19, which is smaller than the piston 1, is arranged to operate in the chamber 9 of the latter and has a forwardly extending piston rod 20 which passes through the tubular piston rod 12 and is connected as at 22 to the brake lever 23. The diameter of the piston rod 20 is less than the interior diameter of the tubular rod 12 of the main brake piston 1 so that a duct 24 is formed between the bore of the tubular piston rod 12 around the piston rod 20 and from the front end of the cylinder or chamber 9 to the atmosphere. The piston rod 20 also has a stop shoulder 21 against which the front end of the tubular piston rod 12 strikes when the main piston 1 nears the forward limit of its stroke.

The operation of my improved compound air brake apparatus is as follows:—

When in normal release or service position, with the train running and the brakes off, the main piston 1 is near the rear end of the brake cylinder and by the action of the spring 15 is held so that the said piston closes the port 14 and cuts off communication between the front end of the brake cylinder and the rear end thereof through the auxiliary reservoir. When in this position the bypass 7 has its port 7$^b$ also closed by the main piston 1 and the port 10$^a$ of the bypass 10 is at the rear end of the piston valve 5 so as to establish communication between the outer atmosphere and the rear portion of the chamber 9 in rear of the prime acting piston 19.

When a reduction is effected through the train pipe 8 in the brake cylinder, pressure from the auxiliary reservoir and in the rear end of the main brake cylinder through the port 18 moves the main piston 1 forwardly and also moves the piston 19 with it. The tubular valve member 13 moves with the main brake cylinder and puts the port 10 in communication with the bypass 7 and cuts off communication between the bypass 10 and the outer air so that pressure equalizes in the main brake cylinder in front of the main piston and in that portion of the chamber 9 of the main piston in rear of the prime acting piston 19, thus causing said piston 19 to move forwardly more rapidly than and independently of the main piston, so that the said piston 19 sets the brakes with moderate degree of power and very rapidly. Ordinarily the main piston will not be moved further but if it is desired to increase the power of the brake as in an emergency this is accomplished by effecting a further reduction through the train pipe. Such further reduction in the front end of the brake cylinder causes the main piston 1 to move further forward, thereby causing the port 10$^a$ to move past the bypass 7, hence cutting off communication between the front end of the brake cylinder and the space between the chamber 9 at the rear of the prime acting piston 19 and such continued forward movement of the main piston 1 compresses air between said main piston 1 and the piston 19, causing the latter to increase its power on the brakes, and finally, after the outer end of the tubular rod 12 has reached the shoulder 21, the power of the main piston is also directly applied to the brakes, the power of the pistons on the brakes being thus applied cumulatively.

To release the brakes, pressure is increased in the front end of the brake cylinder through the train pipe 8 and causes the main piston to move rearwardly and to momentarily uncover the port 14, against the tension of the spring 15, as shown in Figure 3, either charging the auxiliary reservoir through the pipe 17, or if an excess pressure is already in the auxiliary reservoir, such excess pressure will be relieved through the pipe 17 and port 14 back into the front end of the cylinder. The rearward movement of the main piston is initially independent of the piston, 19 the latter remaining stationary until the main piston has moved a sufficient distance to open the port 10ª and establish communication between the rear end of the main piston chamber 9 behind the piston 19 and outer air, through the by-pass 10 and the bore 6 of the fixed piston valve 5. Then the action of the brakes returns the piston 19 to initial position shown in Figure 2, or the action of the spring 15 causes the main piston 1 to assume the release position shown in said figure and close the port 14.

My improved compound air brake apparatus is under the direct control of the engineer under all conditions, and makes it unnecessary to adjust to take up the slack in the brake chamber and can be used, when desired, for operation in connection with ordinary brake apparatus. The valve member 13 being actuated directly by the movement of the main piston, cannot "stick" under any conditions and hence there is no likelihood of the apparatus getting out of order, or refusing to operate.

Having thus described my invention, I claim:—

1. In fluid pressure brake apparatus of the class described, the combination of a brake cylinder having an intermediate port and a duct connecting said port with the rear end of said cylinder, a main brake piston normally closing said port and having a cylinder carried by said main brake piston, a prime acting brake piston in the cylinder of the main brake piston and means actuated by release movement of the main piston to relieve pressure in the cylinder of said main piston behind the prime acting piston and by the braking movement of said main piston to charge the rear portion of said main piston cylinder and cause the prime acting piston to move relatively to the main piston.

2. In fluid pressure brake apparatus of the class described, the combination of a brake cylinder having an intermediate port and a duct connecting said port with the rear end of said cylinder, a main brake piston normally closing said port and having a cylinder carried by said main brake piston, a prime acting brake piston in the cylinder of the main brake piston and means actuated by release movement of the main piston to relieve pressure in the cylinder of said main piston behind the prime acting piston and by the braking movement of said main piston to charge the rear portion of said main piston cylinder from the brake cylinder and cause the prime acting piston to move relatively to the main piston.

3. In fluid pressure brake apparatus of the class described, the combination of a brake cylinder having an intermediate port, an auxiliary reservoir connecting with the rear end of said brake cylinder, a duct connecting said port with the auxiliary reservoir, a main brake piston normally closing said port and having a cylinder, a prime acting brake piston in the cylinder of the main brake piston and means actuated by release movement of the main piston to relieve pressure in the cylinder of said main piston behind the prime acting piston and by the braking movement of said main piston to charge the rear portion of said main piston cylinder from the brake cylinder and cause the prime acting piston to move relatively to the main piston.

4. In fluid pressure brake apparatus of the class described, the combination of a brake cylinder having an intermediate port, an auxiliary reservoir connecting with the rear end of said brake cylinder, a duct connecting said port with the auxiliary reservoir, a main brake piston normally closing said port and having a cylinder, a prime acting brake piston in the cylinder of the main brake piston and means actuated by release movement of the main piston to relieve pressure in the cylinder of said main piston behind the prime acting piston and by the braking movement of said main piston to charge the rear portion of said main piston cylinder from the brake cylinder and cause the prime acting piston to move relatively to the main piston and yieldable means to permit the main brake piston to momentarily open said port when the said piston moves to release position.

5. In fluid pressure brake apparatus of the class described the combination of a brake cylinder having an intermediate port, an auxiliary reservoir connecting with the rear end of said brake cylinder, a duct connecting said intermediate port with the auxiliary reservoir, a main brake piston normally closing said port and having a cylinder, a prime acting brake piston in the center of the main brake piston, a fixed valve member in the brake cylinder having a relief duct and also having a bypass and a valve member movable with the main piston and having a bypass coacting with said relief duct of the first named valve member to relieve pressure behind the prime acting member of the brake piston in the piston carried cylinder when the main piston moves to release position and co-acting with the by-pass of said first named valve member to charge the piston carried cylinder from the brake cylinder when the main brake piston moves to brake applied position.

In testimony whereof, I affix my signature.

WILLIAM G. CANION.